(12) United States Patent
Bell et al.

(10) Patent No.: US 9,337,918 B2
(45) Date of Patent: May 10, 2016

(54) SYSTEMS AND METHODS FOR DIGITAL PROCESSING OF SATELLITE COMMUNICATIONS DATA

(71) Applicant: The Boeing Company, Seal Beach, CA (US)

(72) Inventors: Douglas T. Bell, Torrance, CA (US); Brian A. Clebowicz, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/255,456

(22) Filed: Apr. 17, 2014

(65) Prior Publication Data
US 2014/0226555 A1 Aug. 14, 2014

Related U.S. Application Data

(60) Continuation of application No. 13/251,539, filed on Oct. 3, 2011, now abandoned, which is a continuation of application No. 12/400,357, filed on Mar. 9, 2009, now Pat. No. 8,064,920, which is a division of (Continued)

(51) Int. Cl.
*H04W 72/00* (2009.01)
*H04B 7/185* (2006.01)
*H04B 17/40* (2015.01)

(52) U.S. Cl.
CPC ........ *H04B 7/18526* (2013.01); *H04B 7/18515* (2013.01); *H04B 7/18582* (2013.01); *H04B 7/18584* (2013.01); *H04B 17/40* (2015.01)

(58) Field of Classification Search
CPC ....... H04L 41/08; H04L 45/00; H04W 72/04; H04W 72/1252; H04W 72/1289; H04W 8/22
USPC ............ 455/3.01, 3.03, 561, 427, 12.1, 452.1
See application file for complete search history.

(56) References Cited

U.S. PATENT DOCUMENTS

| 4,568,866 A | * | 2/1986 | Floro et al. .................... 318/696 |
| 5,870,406 A | | 2/1999 | Ramesh et al. |
| 6,157,812 A | | 12/2000 | Sarraf |

(Continued)

OTHER PUBLICATIONS

Bell et al., U.S. Appl. No. 10/767,000, Office Action dated Sep. 19, 2007, 4 pages.
Bell et al., U.S. Appl. No. 10/767,000, Office Action dated Nov. 14, 2007, 10 pages.

(Continued)

*Primary Examiner* — Tu X Nguyen
(74) *Attorney, Agent, or Firm* — Womble Carlyle Sandridge & Rice LLP

(57) ABSTRACT

A digital payload for processing a sub-band spectrum received on an uplink beam at a communications satellite includes a digital channelizer, a digital switch matrix and a digital combiner. The digital channelizer divides the sub-band spectrum into a plurality of frequency slices that can be routed by the digital switch matrix to any of a number of receiving ports. A digital combiner receives the frequency slices and re-assembles them to form one or more output sub-bands for transmission on an output beam of the communications satellite. The digital payload may also include an embeddable digital regeneration module configured to demodulate some or all of the sub-band spectrum to extract a digital bitstream therefrom. The digital bitstream may be processed to implement code-based multiplexing, switching, access control, and other features.

35 Claims, 10 Drawing Sheets

Related U.S. Application Data application No. 10/767,000, filed on Jan. 28, 2004, now Pat. No. 7,542,716.

(60) Provisional application No. 60/443,664, filed on Jan. 29, 2003, provisional application No. 60/443,517, filed on Jan. 28, 2003.

(56) References Cited

U.S. PATENT DOCUMENTS

| | | | |
|---|---|---|---|
| 6,266,329 | B1 | 7/2001 | Lazaris-Brunner et al. |
| 6,301,476 | B1 | 10/2001 | Monte et al. |
| 6,324,184 | B1 | 11/2001 | Hou et al. |
| 6,408,164 | B1 | 6/2002 | Lazaris-Brunner et al. |
| 6,522,643 | B1 | 2/2003 | Jacomb-Hood et al. |
| 6,574,794 | B1 | 6/2003 | Sarraf |
| 6,594,469 | B1 | 7/2003 | Serri et al. |
| 6,611,812 | B2 | 8/2003 | Hurtado et al. |
| 6,665,518 | B1 | 12/2003 | Courtney et al. |
| 6,813,492 | B1 | 11/2004 | Hammill et al. |
| 7,024,158 | B2 | 4/2006 | Wiswell |
| 7,469,141 | B2 | 12/2008 | Macridis et al. |
| 2001/0012277 | A1 | 8/2001 | Campanella |
| 2002/0154687 | A1* | 10/2002 | Bierly et al. ............ 375/222 |

OTHER PUBLICATIONS

Bell et al., U.S. Appl. No. 10/767,000, Office Action dated Mar. 31, 2008, 13 pages.

Bell et al., U.S. Appl. No. 10/767,000, Office Action dated Sep. 16, 2008, 12 pages.

Bell et al., U.S. Appl. No. 10/767,000, Notice of Allowance dated Dec. 9, 2008, 7 pages.

Bell et al., U.S. Appl. No. 12/400,357, Office Action dated Jan. 13, 2011, 7 pages.

Bell et al., U.S. Appl. No. 12/400,357, Office Action dated May 6, 2011, 8 pages.

Bell et al., U.S. Appl. No. 12/400,357, Notice of Allowance dated Aug. 29, 2011, 6 pages.

Dai et al., "The Throughput of Data Switches With and Without Speed Up," Schools of Industrial and Systems Engineering, and Mathematics, Dec. 2006, 40 pages.

Krishna et al., "On the Speedup Required for Work-Conserving Crossbar Switches," IEEE Journal on Selected Areas in Communications, vol. 17, No. 6, Jun. 1999, 10 pages.

Prabhakar et al., "On the Speedup Required for Combined Input and Output Queued Switching," IEEE International Symposium on Information Theory, Aug. 1998, 13 pages.

\* cited by examiner

SYSTEMS AND METHODS FOR DIGITAL PROCESSING OF SATELLITE COMMUNICATIONS DATA

PRIORITY CLAIM

This application is a continuation application of U.S. patent application Ser. No. 13/251,539 filed Oct. 3, 2011, which is a continuation application of U.S. Pat. No. 8,064,920 filed Mar. 9, 2009, which is a divisional application of U.S. Pat. No. 7,542,716 filed Jan. 28, 2004, which claims the benefit of U.S. Provisional Application Ser. No. 60/443,517 filed on Jan. 28, 2003, and U.S. Provisional Application Ser. No. 60/443,664 filed on Jan. 29, 2003. All of these disclosures are incorporated herein by reference in their entirety.

TECHNICAL FIELD

The present invention generally relates to satellites, and more particularly relates to a digital architecture for satellites.

BACKGROUND

Satellites have become invaluable tools in such diverse fields as navigation, communications, environmental monitoring, weather forecasting, broadcasting and the like. Hundreds of man-made satellites now orbit the earth, and each year many more are launched from various nations around the world. Moreover, many homes, businesses and government organizations now use satellite systems on a daily basis for entertainment, communications, information gathering and other purposes.

A typical modern satellite has a metal or composite frame that houses a power source (e.g. one or more batteries, solar cells and/or the like) and various electronic components, as well as one or more antennas. The components generally include one or more "transponders", which are clusters containing one or more radio receivers, frequency translators and transmitters. The total bandwidth of the satellite is provided by the number of transponders, each of which may have a typical bandwidth of 30-70 MHz or so. One type of commercially-available satellite, for example, has a total available bandwidth of 3,528 MHz divided across forty-five C-band and sixteen Ku-band transponders. These transponders are collectively referred to as "the payload" of the satellite.

As shown in FIG. 1, a typical analog transponded communications payload receives multiple uplink beams from the earth or another satellite via an uplink antenna. Each of the received beams is amplified with a low noise amplifier (LNA) and down-converted (D/C) for further processing. The down-converted beams can then be switched, multiplexed (MUX) or otherwise routed and combined prior to upconversion and re-transmission on a downlink beam to the earth or another satellite.

Although some analog transponded satellites may include limited switching and multiplexing functionality, these features are restricted, with switching limited to point-to-point mapping of entire uplink antenna beams to particular downlink antenna beams. This leads to major inefficiencies in the use of satellite bandwidth. A satellite customer typically purchases a "transponder", or dedicated block of bandwidth on a satellite, for a period of one year or more. Transponder bandwidths are typically fixed in the satellite during design (e.g. at 33, 50, 70 MHz, etc.) and are not finely adjustable after the satellite is constructed. Each transponder provides a connection with dedicated bandwidth and power between two points on the earth (point-to-point), or between one point and broad geographic areas (broadcast). While this arrangement is relatively flexible with respect to the type of signals carried, there are major disadvantages in terms of bandwidth efficiency and transmit power control. Should a satellite customer need slightly more bandwidth than that provided by the transponder, for example, the satellite customer must generally purchase another "transponder-sized" bandwidth segment of 33-70 MHz. Further, if a satellite customer does not use all of its transponder bandwidth, this excess capacity remains unused, wasting a limited and valuable commodity. While some customers have attempted to address this inefficiency by sub-allocating purchased transponder bandwidth to other end users via dedicated terrestrial terminal equipment and extensive special arrangements, sub-allocation typically requires the satellite customer to trust the end users to control their own power and bandwidth usage because no positive control is available to regulate bandwidth and power consumption onboard the satellite. In addition, satellite "pirates" frequently "piggyback" signals onto unused transponder bandwidth, robbing transmit power and degrading communication link performance for legitimate users. Due in large part to these inefficiencies and other factors, the cost of satellite communications remains relatively high compared to terrestrial communications systems, thereby limiting the widespread adoption of satellite communications for many applications.

Satellite payloads have evolved more recently to take advantage of digital technologies for enhanced flexibility and control. Digital satellite payloads generally function in either a channelized manner or a regenerative manner. In the former case, a digital payload simulates traditional fixed analog transponders, but adds the ability to finely divide, control and monitor bandwidth and power allocation onboard the satellite. Digital transponded payloads normally have the ability to perform switching of inputs to outputs in a highly flexible manner, enabling them to act as virtual "telephone exchanges", where a request for a channel with specific bandwidth/power and antenna characteristics is made, the channel is set up, used, then disconnected. This "circuit switched" capability ensures that only the bandwidth, transmit power and coverage needed is provided, and only when it is needed. Since transponded channels are merely repeated signals, without any modification, transponder payloads can carry any type of signal without regard to format or modulation mode. Unlike transponded payloads, regenerative payloads perform demodulation and remodulation of uplinked signals, recovering and processing not just the user signal, but also the user data embedded within the signal, enabling the payload to act upon it in a desired manner. Embedded data is most often used for autonomous routing in packet based systems and for security functions, as in many government satellites, or both. In particular, error detection and correction can be performed on demodulated data before it is retransmitted, thereby allowing regenerative satellite payloads to generally have better link performance than transponded payloads. These characteristics and others make regenerative payloads the most efficient available in terms of control, bandwidth and power use. Regenerative systems, however, are commonly built to process a single set of signal and data formats that is fixed at design time. Such systems do not typically provide universal signal compatibility as may be available from transponded payload possesses.

As satellite payload evolution continues, satellite customers are progressing from analog transponded to digital transponded to digital regenerative approaches to extract the maximum revenue bearing bandwidth and power from spectrum allocations fixed by law. Digital transponder systems may be relatively easily made to be backward compatible with analog transponder systems since neither system provides onboard data processing. Regenerative systems are generally not backward compatible, however, due to their requirements for specific signal and data types. While the transition from analog transponded payloads to much more efficient digital transponded payloads is clear, the path to provide even more efficient regenerative payload capability without dropping legacy system users or requiring the satellite to carry significantly more processing electronics has been difficult. To avoid loss of operation and to provide continuous revenue flow, existing satellite customers generally desire to transition transponded end users to regenerative services in a gradual manner, over the many-year life span of an expensive satellite asset.

It is therefore desirable to improve the flexibility and functionality of satellite payloads used in data communications in commercial and/or government settings. It is further desirable to provide a satellite payload capable of simultaneously mixing transponded and regenerative modes in a hardware efficient payload, and to provide in-service programmability for regenerative signal and data formats. Furthermore, other desirable features and characteristics will become apparent from the subsequent detailed description and the appended claims, taken in conjunction with the accompanying drawings and this background of the invention.

BRIEF SUMMARY

According to various exemplary embodiments, both digital transponded and digital regenerative functions are provided within an all-digital satellite payload. By combining transponded and regenerative functions into a common digital platform, numerous efficiencies of scale are realized, and the overall efficiency and functionality of the satellite is dramatically improved.

In one embodiment, a digital payload for processing a sub-band spectrum received on an uplink beam at a communications satellite includes a digital channelizer, a digital switch matrix and a digital combiner. The digital channelizer divides the sub-band spectrum into a plurality of frequency slices that can be routed by the digital switch matrix to any of a number of receiving ports. A digital combiner receives the frequency slices and re-assembles them to form one or more output sub-bands for transmission on an output beam of the communications satellite. The digital payload may also include an embedded digital regeneration module configured to demodulate some or all of the sub-band spectrum to extract a digital bitstream therefrom. The digital bitstream may be processed before, during and/or after the routing function to implement code-based switching, multiplexing, access control, output linearization and other features.

In another embodiment, a method of processing a sub-band spectrum received on an uplink beam at a digital payload for a communications satellite suitably includes the steps of digitally dividing the sub-band spectrum into frequency slices and routing each of the frequency slices between a number of receiving ports. Some or all of the frequency slices may be digitally demodulated, processed and/or remodulated before, during and/or after routing, as appropriate. The routed and/or processed frequency slices are then digitally re-assembled to thereby form output sub-bands for transmission on one or more output beams of the communications satellite.

Other aspects variously relate to satellite components, systems and methods. The concepts set forth further herein allow new techniques for commercializing satellite resources, and several new business models within the satellite field. These and other aspects of various exemplary embodiments are set forth in detail below.

BRIEF DESCRIPTION OF THE DRAWINGS

The present invention will hereinafter be described in conjunction with the following drawing figures, wherein like numerals denote like elements.

DETAILED DESCRIPTION

The following detailed description is exemplary in nature and is not intended to limit the invention or the application and uses of the invention. Furthermore, there is no intention to be bound by any theory presented in the preceding background of the invention or the following detailed description.

According to various exemplary embodiments, a new digital architecture provides a backward-compatible, broadband, switched channelizing digital payload for communications satellites. Because the amount of usable bandwidth available from a digital payload may be much greater than that provided by a corresponding analog payload, the cost of bandwidth provided by the satellite is suitably reduced, thereby allowing reduced pricing to consumers and/or greater profit margins for bandwidth suppliers. Moreover, the integrated digital architecture allows for additional features and functionalities not previously available from other satellite payloads. As an example, various embodiments allow payload resources (e.g. bandwidth, power, frequency plans, antenna coverages, etc.) to be readily re-assigned during design or manufacturing of the satellite, or even on orbit, thereby greatly improving the flexibility of satellite designs. By allowing bandwidth and other resources to be adjusted on-orbit, the satellite can adapt to changing consumer needs, thereby improving risk assessment of satellite implementations and enabling new marketing strategies for selling or reselling satellite bandwidth. These new strategies, in turn, provide new revenue streams for bandwidth providers while improving service to consumers.

The various embodiments of the new architecture result in an all-digital satellite payload that is modular, reconfigurable and programmable. Although various embodiments of the new architecture are described using terms such as "flexible transponder", "modular data handler" and "flexible satellite", a wide array of equivalent embodiments may be formed using the general concepts set forth herein.

Figure 2:
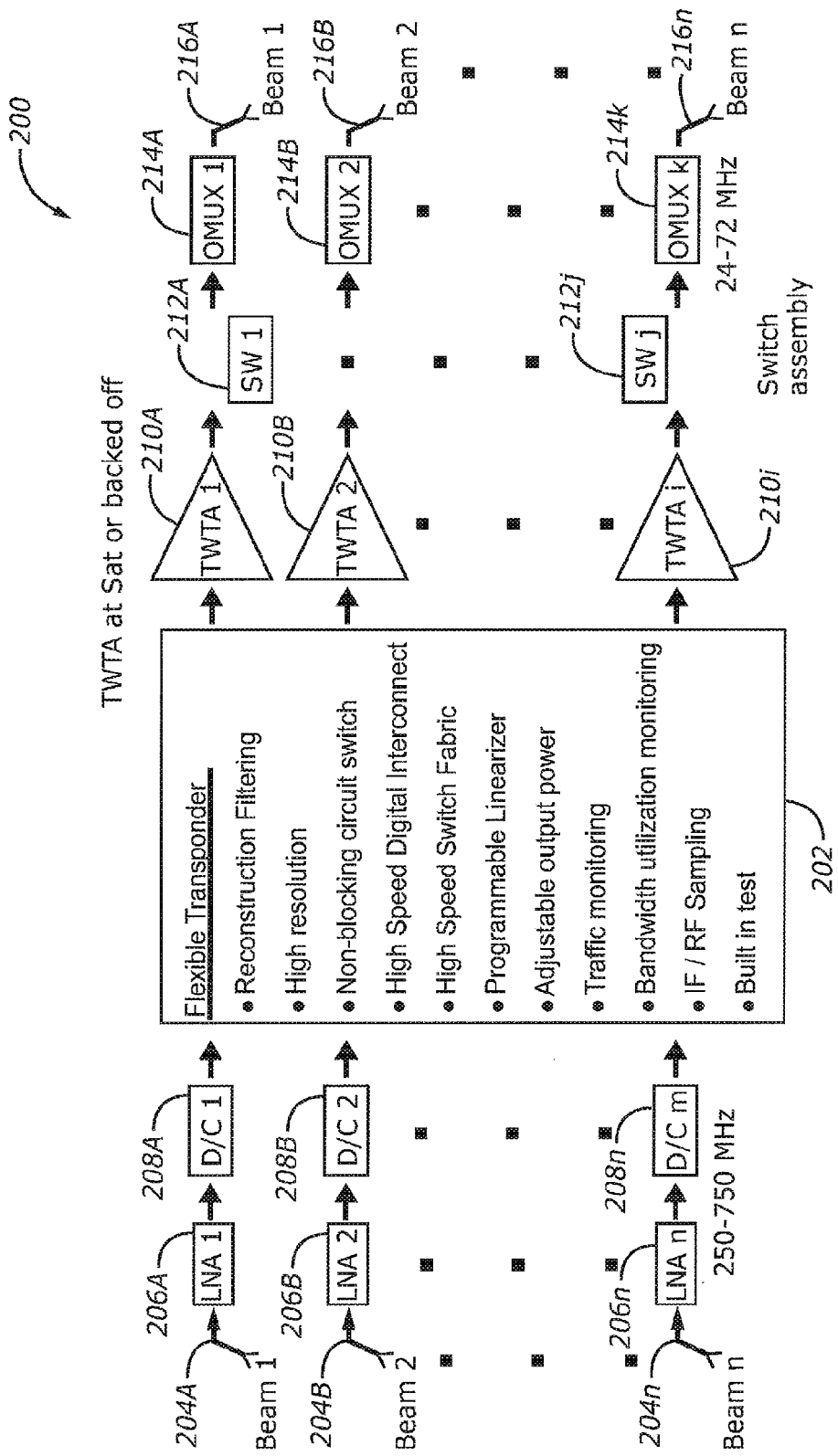
FIG. 2 is a block diagram of an exemplary satellite having a flexible transponder payload.

Turning now to the drawing figures and with reference now to FIG. 2, an exemplary satellite payload 200 suitable for use with satellite communications is shown. In the embodiment shown in FIG. 2, payload 200 suitably includes any number of input amplifiers 206A-n, optional downconverters (D/C) 208A-n, output amplifiers 210A-i, output switches 212A-j and output multiplexers 214A-k that are arranged to interoperate with a digital transponder unit 202 to provide digital processing of input beams 204A-n and to create output beams 216A-n that are transmitted to a receiver at another satellite or at the earth's surface via a suitable antenna.

In operation, each input beam 204 is received via a suitable antenna (not shown in FIG. 2, but described more fully below). Each beam 204 may be filtered to isolate an appropriate band of frequencies (i.e. "sub-bands" or "channels") to be amplified by a low noise amplifier (LNA) or other input amplifier 206 to improve the strength of the received signal. The amplified sub-band is then downconverted from the received frequency to a suitable intermediate frequency (IF) for digital processing. While the embodiment shown in FIG. 2 shows block down-conversions of 250-750 MHz sections of input bandwidth and switching and filtering of 24-72 MHz channels, any other frequency bands or ranges may be used in a wide array of alternate embodiments. For example, high-quality analog-to-digital converters may be used to sample incoming sub-bands at rates as high as 550 MHz or greater, thereby reducing or eliminating the need to downconvert the amplified sub-bands in many embodiments, as described more fully below. While conventional satellites most commonly use C and Ku band receive or transmit frequencies, the techniques described herein are extendable to UHF, L, S, and Ka band frequencies, as well as any other frequencies.

Figure 1:
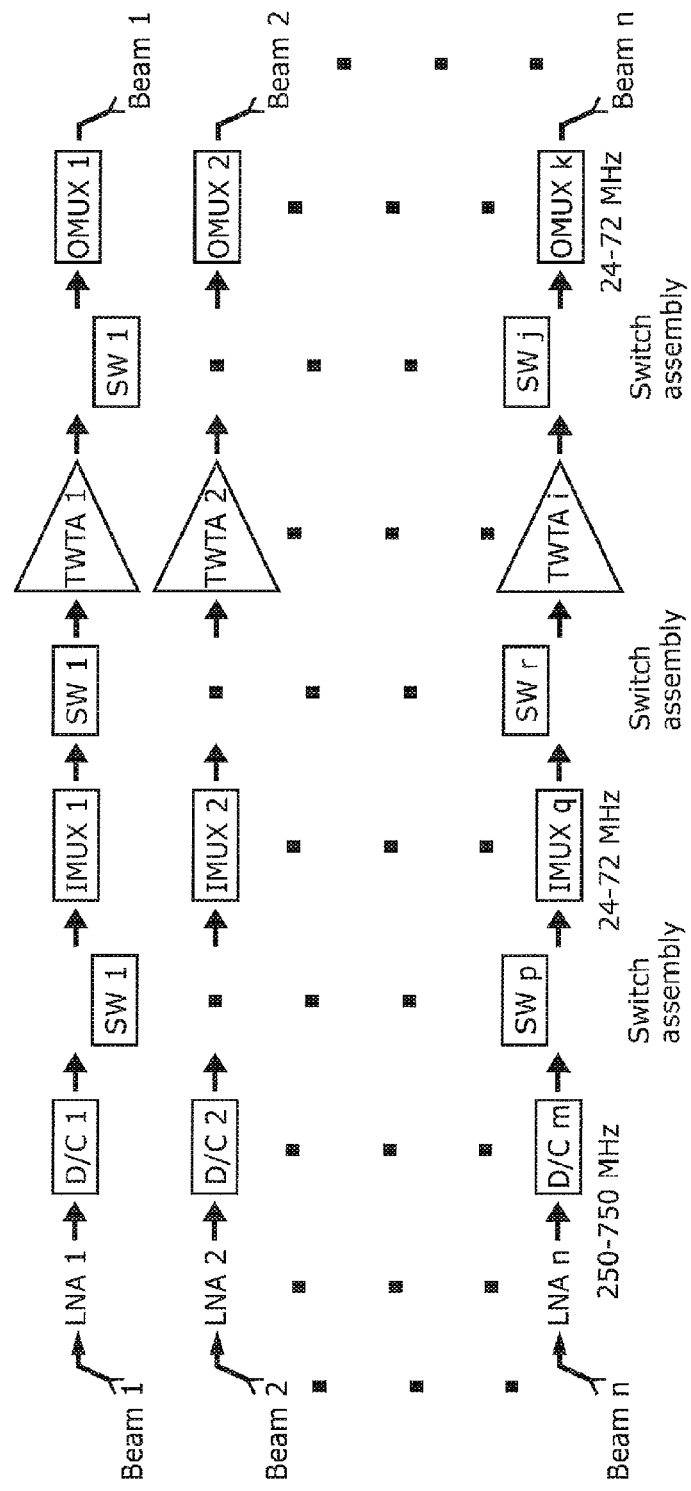
FIG. 1 is a block diagram of an exemplary prior art satellite payload.

While conventional circuit switching architectures (e.g. that shown in FIG. 1) simply switched and multiplexed entire channels between input and output beams, various embodiments of digital transponder unit 202 are capable of digitally dividing each sub-band into frequency slices that can be separately switched, processed, routed and re-combined in output sub-bands as described more fully below. To this end, the digital transponder unit 202 replaces the input multiplexers and associated switches, cabling, etc. shown in FIG. 1 while providing additional functionality and efficiency not available in prior systems. This digital processing enables a number of new features that were not previously available, including reconstruction filtering of individual slices, traffic monitoring, transmit linearization, optimization, access control and the like. Moreover, the digital transponder 202 allows for tailoring of bandwidth and other resource allocations, thereby greatly improving the efficiency of payload 200. Bandwidth allocations on both uplinks 204 and downlinks 216 can be adjusted in real time during operation, for example, to re-assign excess bandwidth to beams or sub-bands experiencing increased traffic demands. Various implementations of digital transponder units 202, components and associated processing techniques are described below in greater detail.

The output sub-bands assembled by digital transponder unit 202 are appropriately amplified with traveling-wave tube amplifiers (TWTA), solid-state power amplifiers (SSPA) or other suitable output amplifiers 210. Although the particular output power varies from embodiment to embodiment according to such factors as the altitude above earth, transmit frequencies used, etc., typically output power of about 50 W may be used at C band frequencies and about 80-120 W of power may be used at Ku band. The outputs of some or all of the output amplifiers 210 may be switched, multiplexed together at output multiplexers 214, and then re-transmitted through the transmit antennas to form output beams 216. Before multiplexing, optional variable power dividers (not shown in FIG. 1) may be used to allocate power to the various coverage areas as appropriate.

Figure 3:
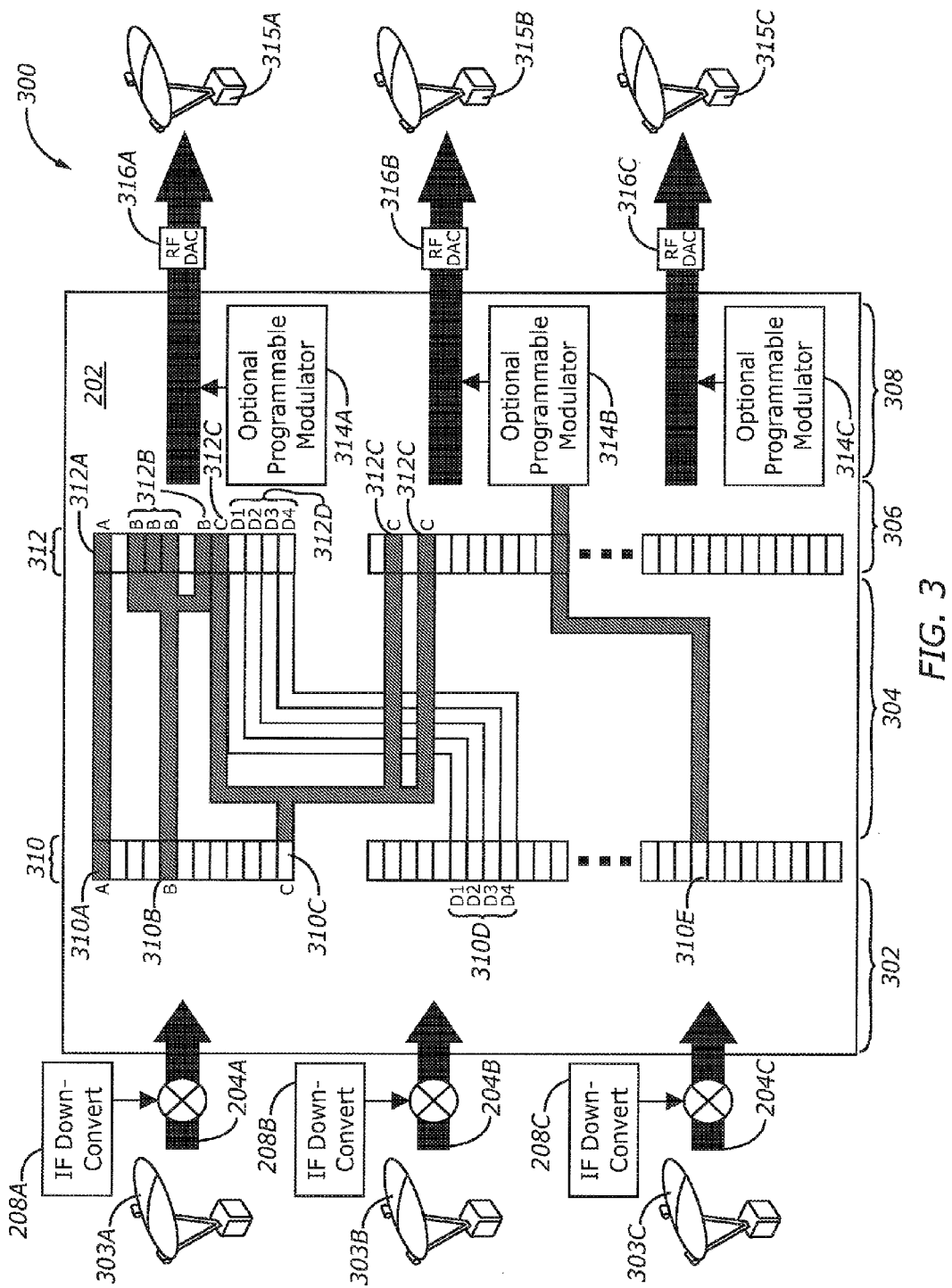
FIG. 3 is a block diagram of an exemplary digital satellite payload.

FIG. 3 shows one logical layout of an exemplary digital satellite system 300. With reference now to FIG. 3, an exemplary digital transponder unit 202 suitably communicates with any number of uplink antennas 303A-N and any number of downlink antennas 315A-N to digitally process uplink beams 204A-N and downlink beams 216A-N, respectively. As described above, uplink beams 204 may be downconverted in various embodiments to allow sampling and A/D conversion at an appropriate frequency, although the downconverters 208 may be eliminated or incorporated into transponder unit 202 in various alternate embodiments.

Uplink and downlink antennas 303 and 315 may be implemented with any conventional antennas used in satellite communications. In various embodiments, antennas 303 and 315 are implemented with digital or analog beamforming antennas having any number of independently-addressable transmit/receive elements. Examples of such antennas include the various spot beam dishes, multi-beam feed antennas, direct radiating array antennas and/or phased array antennas available from Boeing Satellite Systems of Los Angeles, Calif. and others.

Digital transponder unit 202 suitably provides on-board switching and sub-channel routing functionality. Because signals are digitally routed within transponder unit 202, variable sub-channel bandwidth can generally be provided with negligible degradation in signal quality. Channel widths, spacing and switching may be further programmed or otherwise modified on orbit, and some or all of the output sub-channels may be optionally configured with a commandable downlink level control as appropriate. Further embodiments may also optimize uplink connectivity, as described more fully below (e.g. in conjunction with FIG. 10).

As shown in the exemplary embodiment of FIG. 3, digital transponder unit 202 suitably includes a digital channelizer module 302, a digital switch matrix 304, a digital combiner 306 and a digital regeneration module 308. The various modules and sub-systems shown in FIG. 3 are intended as logical constructs; in practice, each sub-system may be implemented with any combination of physical hardware and/or software components. Each uplink beam and/or sub-band spectrum, for example, may have one or more corresponding processing cards or "slices" associated therewith, with each of the various cards communicating over a common backplane bus. Such an embodiment is described below in conjunction with FIG. 4. Alternatively, the various functions and channel assignments may be shared between various cards, modules or components in a wide array of alternate embodiments.

Channelizer 302 includes any digital circuitry and/or software modules capable of receiving a digital representation of the sub-band spectrum received on an uplink beam 204 and of dividing the sub-band spectrum into any number of equally or unequally sized frequency 'slices' 310. Slices 310 are also referred to herein as "packets" because time or code division multiplexed information segments within the slices may be readily routed independently of the other slices and segments in the sub-band spectrum, as described below. In various embodiments, digital channelizer module 302 is implemented with an application specific integrated circuit (ASIC). Exemplary ASICs formed using complementary metal oxide semiconductor (CMOS) technologies and the like are available from International Business Machines of Armonk, N.Y. and others.

Switch matrix 304 is any hardware and/or software structures capable of directing frequency slices 310 between various ports 312 as appropriate. In various exemplary embodiments, switch matrix 304 is implemented with one or more switch ASICs associated with each sub-band or processing card, with each ASIC within matrix 304 being interconnected by a shared bus or other communications medium as described below. The various ASICs may be custom-built integrated circuits, for example, or may be fabricated from field programmable gate arrays (FPGAs) that have been suitably programmed to store and/or forward digital data as appropriate within switch matrix 304.

Ports 312 are any hardware or software constructs (e.g. memory locations, bus addresses, Unix-type socket ports, or other physical or logical constructs) capable of receiving frequency slices 310 for subsequent processing. Switch matrix 304 may provide for in-beam and/or cross-beam point-to-point, multi-cast and/or broadcast switching. In the exemplary embodiment shown in FIG. 3, for example, frequency slice 310A is shown directly mapped to port 312A, which is associated with the same sub-band spectrum 204 as slice 310A. Alternatively, one or more slices 310 may be mapped to ports 312 associated with one or more other beams 204. FIG. 3 shows slice 310B mapped to ports 312B for an in-beam multi-cast, for example, with slice 310C mapped to multiple ports 312C on different beams to show an example of cross-beam multicasting. Because such switching is performed digitally, little or no signal degradation typically results.

Regeneration module 308 is any hardware and/or software construct(s) capable of further processing the digital data encoded within the various frequency slices 310. In an exemplary embodiment, such processing is executed by one or more fixed ASICs or programmable chips 314 embedded within payload 300. Because the frequency slices 310 are already processed digitally by the channelizer, the various bit streams encoded within each slice 310 may be economically demodulated, further processed and remodulated prior to transmission using any appropriate algorithms or techniques, without major duplication of expensive sampling and filtering functions. This synergy between channelized and regenerative architectures enables both types of processing to share overlapping functionality and to coexist, without requiring the total duplication of circuitry that casual inspection might suggest. Types of digital processing that may be performed include access verification, encryption, code division multiplexing (e.g. CDMA), data regeneration (i.e. recovery of corrupt or unclear data), compression, packet switching and/or any other data processing. Demodulation/remodulation may take place at any point during the channelizing/routing process, and remodulation need not take place immediately following any processing handled by regeneration module 308. Demodulated data may be channelized and/or routed prior to remodulation, for example, or otherwise processed as appropriate. In the exemplary embodiment shown in FIG. 3, for example, a frequency slice 310E is shown routed to a port associated with an optional programmable modulator 314B associated with another beam 204B for processing.

Combiner module 306 is any hardware and/or software constructs capable of re-assembling the various frequency slices into new sub-bands 216. After the frequency slices 310 are routed to the appropriate ports 312 and/or otherwise processed as desired, data received at the various ports 312 associated with each downlink beam 216 are suitably combined prior to re-transmission. The re-combined sub-bands are converted to analog signals that can be transmitted on a downlink antenna 315 by digital-to-analog converters (DACs) 316.

In operation, then, digital transponder unit 202 suitably receives sub-band spectra from the various uplink beams 204, divides the sub-band spectra into frequency slices that can be individually routed across the various beams, provides any desired additional processing (e.g. signal reconstruction, encryption, etc.) and recombines the various slices to create new downlink beams 216. The overall capability of unit 202 is greatly enhanced through the additional digital signal and data processing that can be performed on digitized signals and data packets. Further, the effective bandwidth of system 300 is greatly increased in comparison to similar analog circuit-based systems by the efficiency with which user signals and data can be packed together to fit into available bandwidth with minimum unusable segments. This is because signals and data can be processed in relatively small segments rather than in fixed-sized end-to-end circuits. The overall efficiency of system 300 in terms of bandwidth, power consumption and other factors is greatly enhanced, since demands for additional capability on one beam (or portion of a beam) 204 can be met with excess available capacity from the same or another beam.

Figure 4:
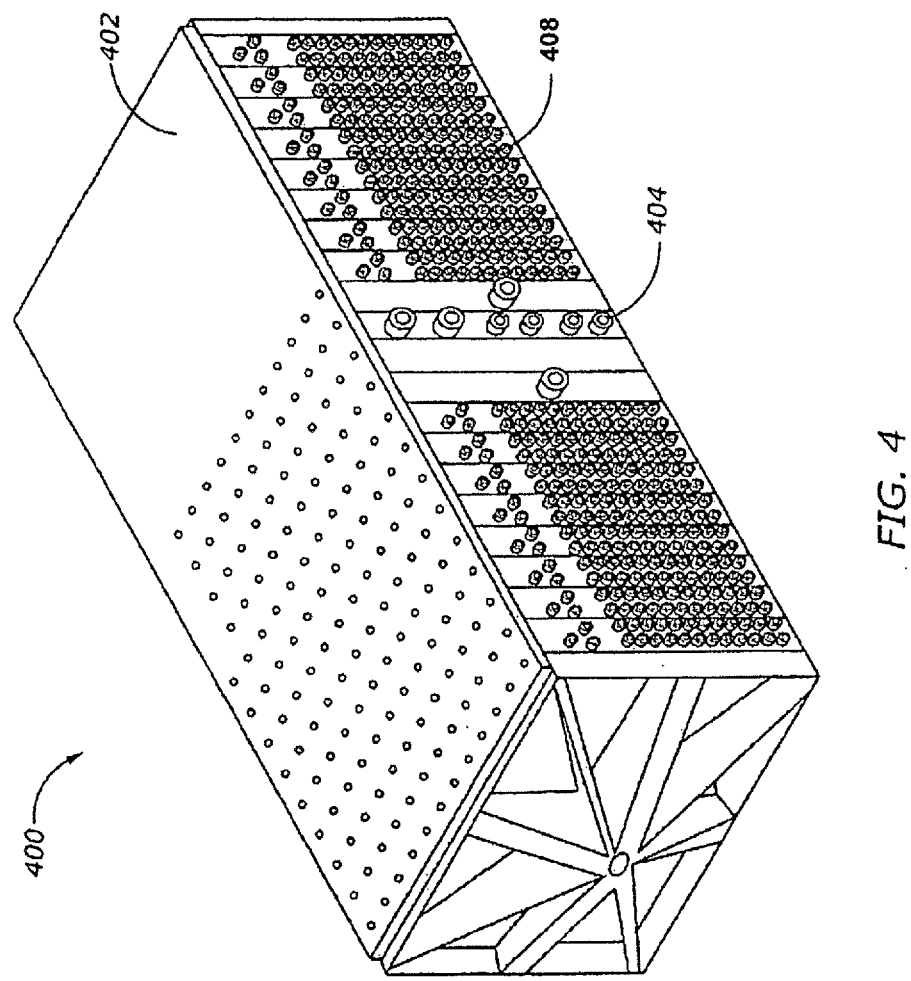
FIG. 4 is a perspective view of an exemplary embodiment of a packet processing digital payload.

With reference now to FIG. 4, an exemplary hardware implementation of a digital signal processing (DSP) payload 400 suitably includes a cabinet 402 housing various processing cards 404, 408 as appropriate. Cabinet 402 typically includes any number of slots for receiving the various cards as well as a backplane bus to facilitate data transfers between components on separate cards. Cabinet 402 may also have appropriate connects for providing electric power to each card 404, 408.

Because different embodiments may incorporate any number of processing cards, DSP payload 400 readily scales to implementations of any size by simply adding or removing processing cards from cabinet 402. Various implementations may include, for example, any number of transponder cards 404 as well as one or more resource management cards 408. Redundant ("backup") cards may also be provided in the event that one or more cards should fail during operation. In one embodiment, cabinet 402 supports three active transponder cards 404 and a resource management card 408, as well as a backup transponder card and a backup management card.

Each card 404, 408 housed within cabinet 402 suitably interfaces with the backplane bus for inter-card data communications. Although any bus design could be used, exemplary embodiments may use industry standard bus architectures such as the peripheral component interface (PCI) bus, VME-bus, or any of the other buses described in various IEEE, ARINC, MIL-STD and/or other commercial and/or military communications standards. In one embodiment, the backplane bus is based upon a matched-impedance UNILINK switch fabric available from International Business Machines of Armonk, N.Y.

The various transponder cards 404 operating with payload 400 typically include one or more inputs capable of supporting one or more input channels as well as an interface to the backplane bus, suitable processing circuitry, and any number of outputs. In various embodiments, input and output slices with six or more 540 MHz input channels may be provided, although other embodiments may have any number of channels operating at any frequency. Various embodiments may include any number of input and/or output slices (e.g. 1-7 inputs and 1-7 outputs); the number of input slices need not match the number of output slices. Moreover, transponder cards 404 typically include a microcontroller, digital signal processor or other processor as well as a distributed dataswitch and associated circuitry for supplying power to the card. Although any processor could be used with the various embodiments, one exemplary embodiment uses PowerPC 750 processors on both transponder cards 404 and resource management cards 408. Data processing for switch matrix 304 (FIG. 3) and other functions may be shared between multiple cards 404, 408 to further improve redundancy and load sharing of system 400.

Figure 5:
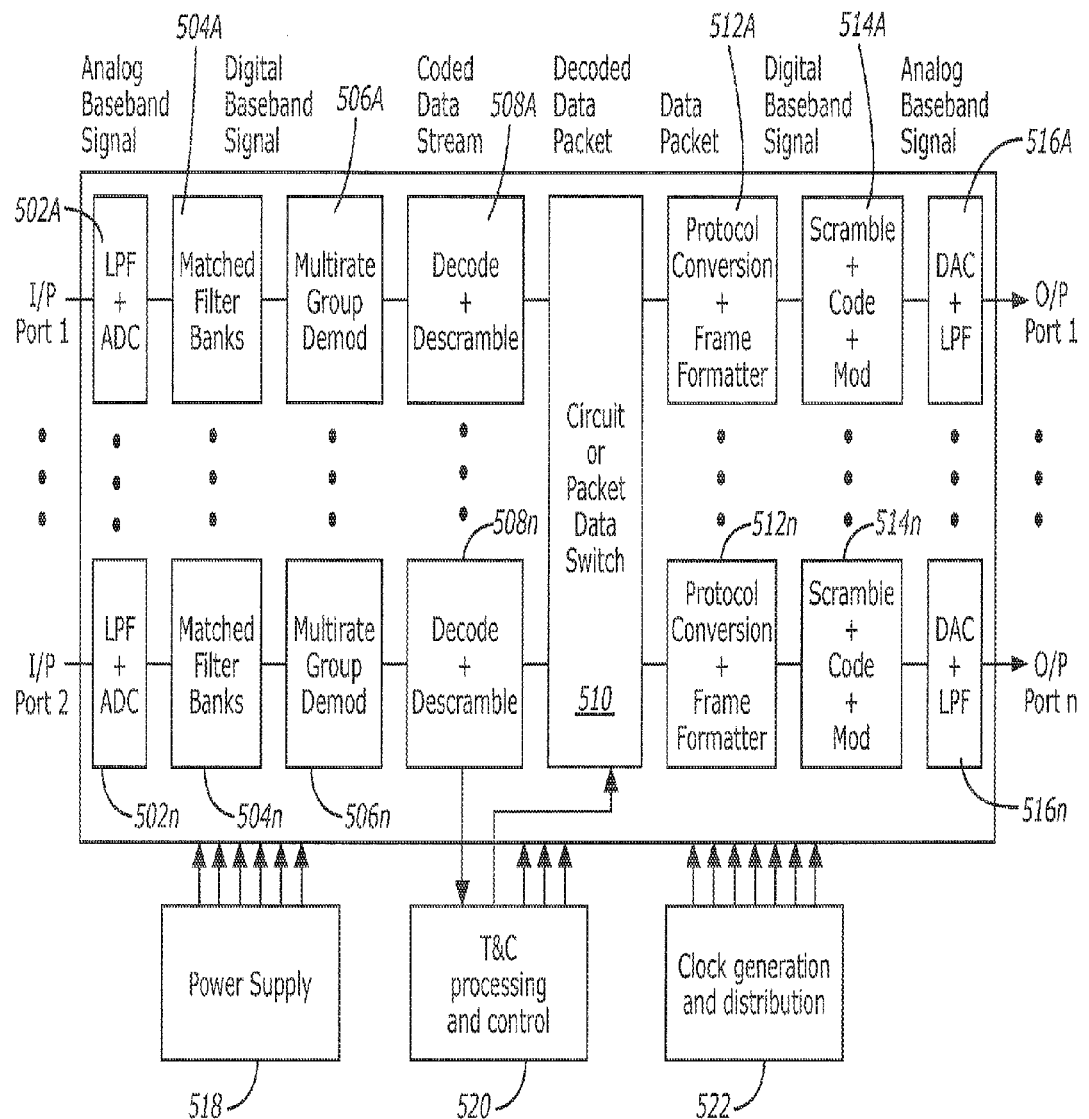
FIG. 5 is a block diagram of an exemplary embodiment of a packet-processing digital payload.

Referring now to FIG. 5, an exemplary DSP payload 500 is shown in logical form as including any number of channels interconnected by data switch 510. Each channel generally corresponds to one sub-band spectrum received on an uplink beam 204, as appropriate. Any number of channels may be processed on a common data processing card 404 described above. Payload 500 also includes power supply 518, telemetry and command (T&C) processing 520 and clock generation/distribution 522 functions as appropriate. T&C processing 520 and/or clock generation 522 functionality may be provided by one or more resource management cards 408 (FIG. 4), or may be shared between one or more data processing cards 404.

Each channel suitably includes various modules for digitally processing received signals. In the exemplary embodiment shown in FIG. 5, the analog baseband signal received from the uplink antenna is first filtered and A/D converted at 502 to produce digital equivalents that can be further processed. As mentioned above, filtering and A/D conversion may be handled within payload 500, or may be handled in a separate A/D converter that can be located near the antenna to reduce signal noise, interference and other sources of error or distortion. The digital baseband signals may be further filtered 504 or otherwise shaped/processed to obtain a desired digital sub-band spectrum, for example. These digital signals may be demodulated at demodulation module 506 as appropriate. Demodulator 506 suitably operates at variable rates to accommodate different data types and protocols from varying data sources. The demodulated signals are then decoded, descrambled or otherwise processed 508 to a digital bitstream that can be packetized, routed and/or otherwise processed. Decoding module 508 suitably communicates with the T&C module 520, which gathers information about the data and provides any command instructions to process the data as desired. The demodulated data can be channelized and routed from any input port to any output port on payload 400. Switch 510 therefore accommodates switching and routing of individual packets and/or circuits by mapping various slices of decoded packet data to one or more switch output ports, as described above in conjunction with FIG. 3.

Additional processing of the decoded data packets may take place before, during or after routing by switch 510. Examples of the various types of processing that may be implemented include encryption/decryption, access control/authentication, data compression/extraction, protocol conversion, signal regeneration, error correction and the like. Because the decoded data packets are simply streams of digital bits, any type of processing can be performed on the data prior to remodulation and D/A conversion. Such processing may be controlled and/or carried out by T&C module 520 and/or by other processors on any transponder card 404 or resource management cards 408 (FIG. 4).

After digital processing and routing, the various digital packets/slices are recombined and formatted 512 as appropriate. The recombined packets can then be encrypted, coded, multiplexed, re-modulated or otherwise processed by module 514 prior to transmission on a downlink beam. DSP payload 500 may also include filtering and D/A conversion capability 516, or D/A conversion may take place in closer physical proximity to the downlink antennas to reduce noise, distortion and the like.

Figure 6:
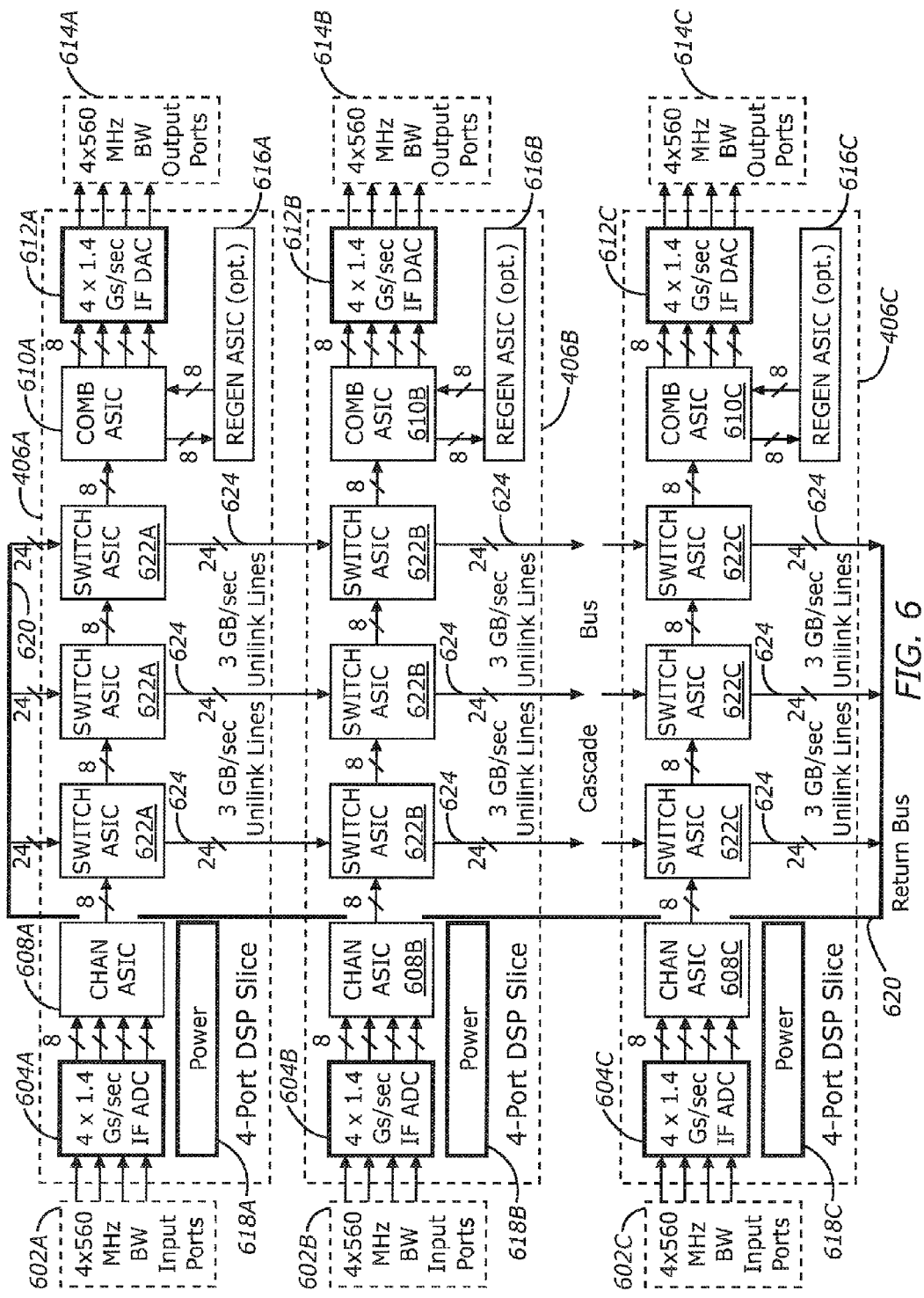
FIG. 6 is a block diagram of an exemplary embodiment of a multi-slice digital payload.

Additional detail of an exemplary implementation of a digital payload 600 having three multi-port DSP processing slices 406A-C is provided in FIG. 6. With reference to FIG. 6, digital payload 600 suitably includes any number of DSP slices 406, each of which include an ADC 604, a channelizer 608, a digital switch fabric 622, a digital combiner 610, and a DAC 612, in addition to an optional regeneration module 616. Each slice 406 also includes power circuitry 618 for providing electric power to the various slice components as appropriate. As described above in conjunction with FIG. 3, each of the various data processing components may be implemented with application-specific integrated circuitry, or with any other combination of hardware and/or software.

As described above, each processing slice 406 receives sub-band spectra or other input signals from an uplink antenna. In FIG. 6, these sub-band spectra are shown as 560 MHz frequency bands provided in groups of four bands at an input port 602, although other embodiments may process different numbers of channels and/or channels of varying bandwidths. Each of the input signals are received at slice 406, where the signals are converted to digital equivalents by ADC 604. These digital equivalents may be provided in any manner to a channelizer circuit 608. In the embodiment shown in FIG. 6, digital equivalents are provided via 8-bit parallel data connections, although alternate embodiments may use any level of bit resolution transmitted over any serial and/or parallel connection. The channelized digital bit streams are routed by various switching circuits 622 interconnected by backplane bus 620/624. As shown in FIG. 6, a UNILINK-type data bus couples the various switch ASICs 622 in a series of cascading logical rings, with data transfers occurring in a linear fashion via switch interconnections 624 and return bus 620. In alternate embodiments, the various switch ASICs 622 may be interconnected in any mesh, web, star, linear, ring or other manner. Switched frequency slices 310 are then recombined at ASICs 610 and/or digitally processed by regeneration ASICs 616 as appropriate. The recombined signals may then be D/A converted 612 and provided to the downlink antennas via output ports 614 as appropriate.

Using the structures and logical constructs shown in FIGS. 2-6, digital payloads of varying capabilities may be readily fashioned. Referring again to FIG. 2, one embodiment of digital payload 200 provides routing and data reconstruction functionality, as well as optionally adjusting output power, providing for output linearization, adjusting output power and/or monitoring traffic and/or bandwidth utilization within payload 200. Output linearization, for example, may be provided by pre-compensating data provided to the downlink beams for distortion observed during the downlink transmission. This pre-compensation may be programmably modified on-orbit in response to actual distortion observed, ground weather conditions, and/or other factors. Similarly, output power of the various downlink beams can be programmably adjusted upwardly or downwardly as needed to compensate for weather changes, evolving technologies, or other factors.

Figure 7:
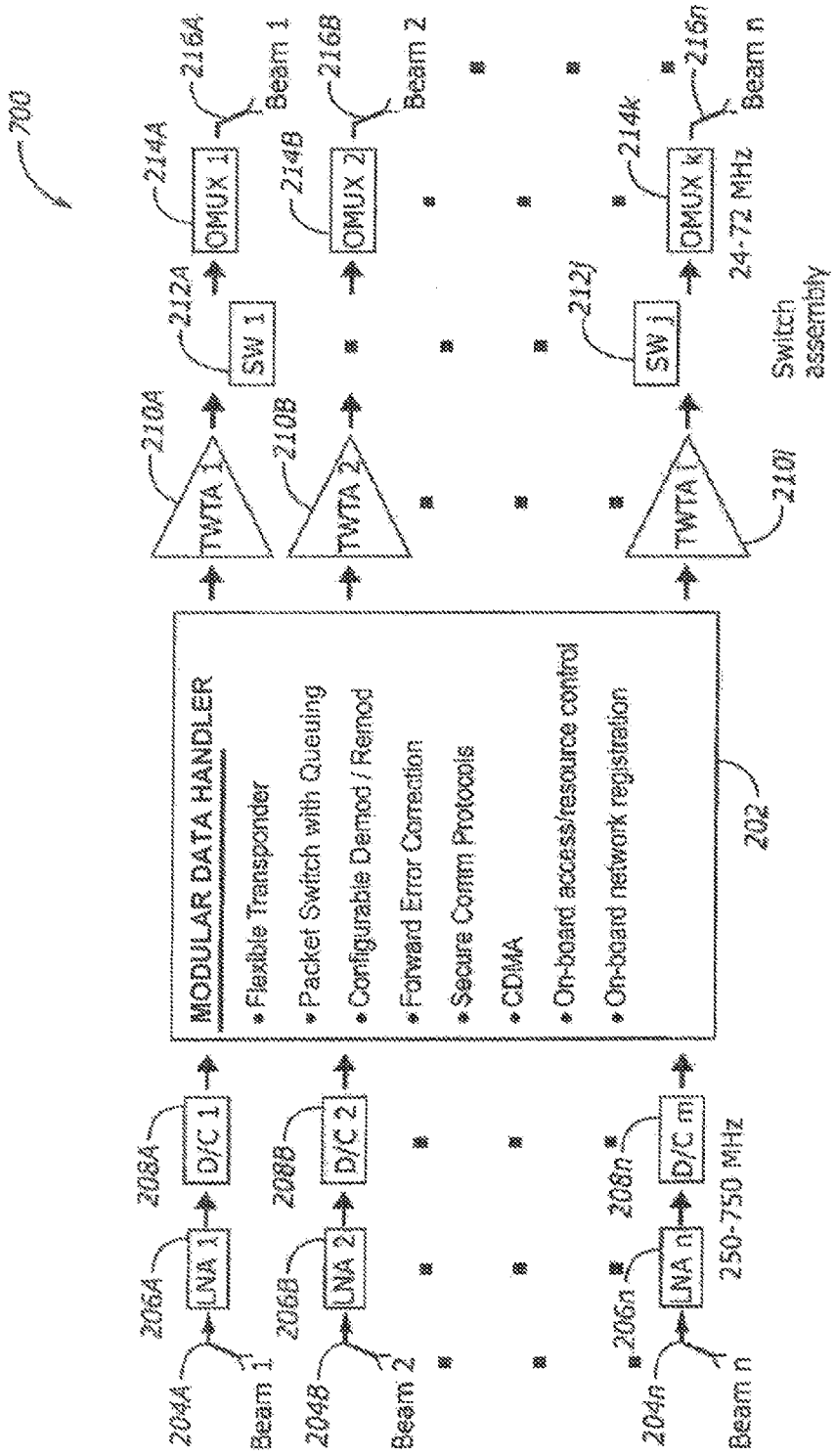
FIG. 7 is a block diagram of an exemplary satellite having a modular data handling capability.

With reference now to FIG. 7, a further embodiment 700 of digital payload 200 suitably provides enhanced modular data handling capability as appropriate. Such data handling capabilities are typically processed or controlled by regeneration module 308 (FIG. 3) and/or T&C processor 520 (FIG. 5). Because the various digital frequency slices 310 (FIG. 3) can be demodulated to extract a raw bit stream, digital payload 200 has access to the channelized signals, thereby allowing the signals to be processed and manipulated to implement additional features not readily available in the satellite environment. Examples of data handling capabilities include packet switching with additional queuing, forward error correction (e.g. using checksum, CRC, digest or other error correction techniques), code based multiplexing (e.g. code division multiple access (CDMA)), and/or enhanced security through user authentication, access authorization, data encryption and/or the like. Examples of enhanced security include network registration and/or access control using digital credentials (e.g. passwords, digital signatures or the like).

Figure 8:
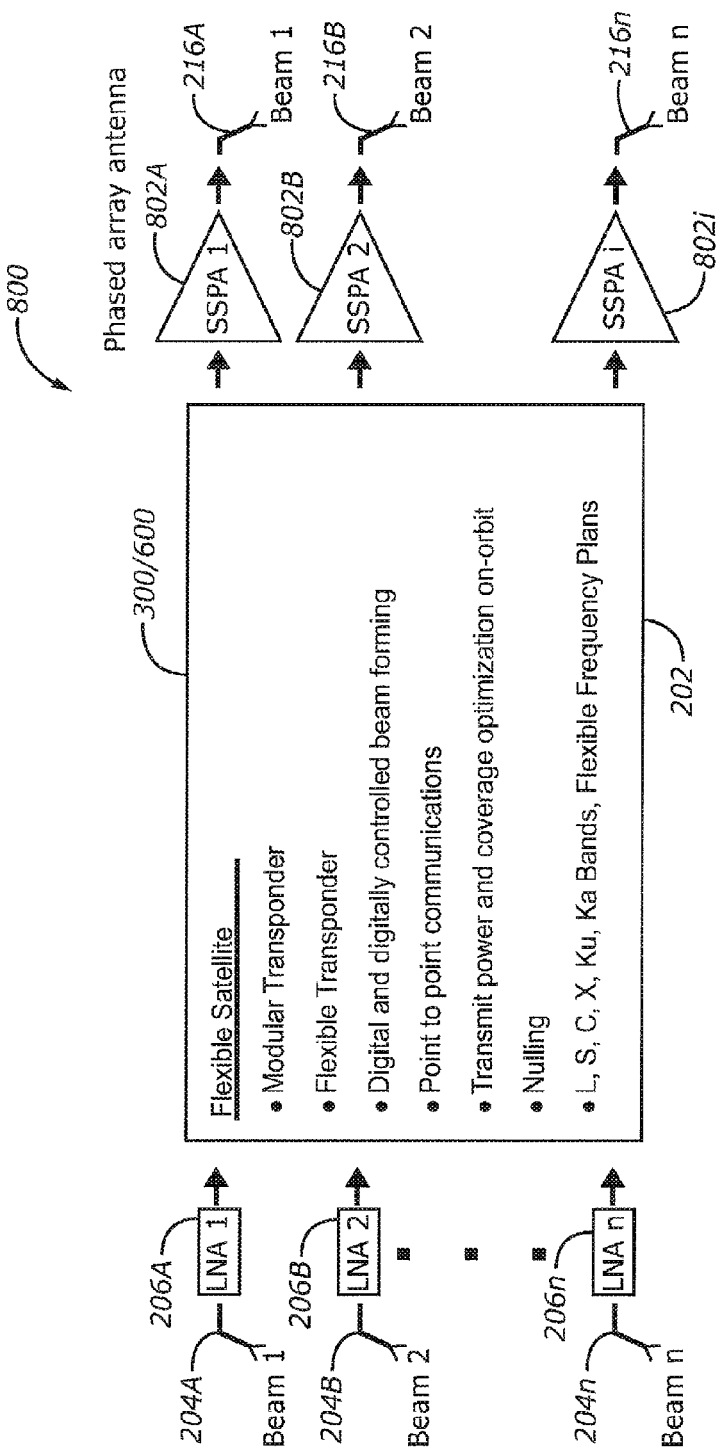
FIG. 8 is a block diagram of a satellite having an exemplary all-digital payload.

In an even further embodiment, the digital signal processing capabilities of payload 200 can be expanded to incorporate direct beam forming, essentially creating an all-digital satellite payload 800 as shown in FIG. 8. Such embodiments typically do not require downconvert or output multiplexing capabilities, since the digital payload 200 is able to directly interoperate with phased array and/or other antennas to process uplink data and to form downlink beams ready for transmission. In such embodiments, digital payload 200 receives the analog baseband signals from the input amplifiers 206, and provides output signals to output amplifiers 802 in analog form. Output amplifiers may be solid state power amplifiers (SSPAs) or any other suitable amplifiers. Because all of the data processing is handled digitally within payload 800, significantly enhanced capabilities such as direct point-to-point routing, transmit power and coverage optimization, anti-jamming functionality (e.g. nulling) and the like.

Nulling, for example, typically involves detecting a hostile signal at the antenna and instantly countering with a "null" signal to minimize the energy of the hostile signal as compared to friendly signals. Because digital payload 200 is able to form individual downlink beams and to adjust the power of the output beams, nulling functionality can be directly implemented within payload 200 by creating a desired downlink signal that can be directed at the hostile source. Moreover, hostile signals can be digitally extracted from uplink signals received, and/or access restrictions can be used to further secure data transmissions within payload 200.

The architecture described above provides a platform for designing, building and operating satellites and to tailor the performance of such satellites to specific applications desired. Both beam coverage and frequency, for example, can be made variable and changed on-orbit. Moreover, both channelized and regenerative functionalities are made available, and these functionalities can be enhanced or changed while the satellite is in orbit. Still further, the flexibility designed into the system allows a high degree of frequency reuse while maintaining full communications flexibility.

Because various payload resources (bandwidth, power, etc.) can be readily monitored and adjusted on-orbit in real time within digital payload 200, for example, new techniques for exploiting the payload resources are enabled. As mentioned above, bandwidth and other resources may be monitored (e.g. by telemetry and command module 520 in FIG. 5 or the like) to re-assign excess resources to other beams, channels or slices having a need for such resources.

Figure 9:
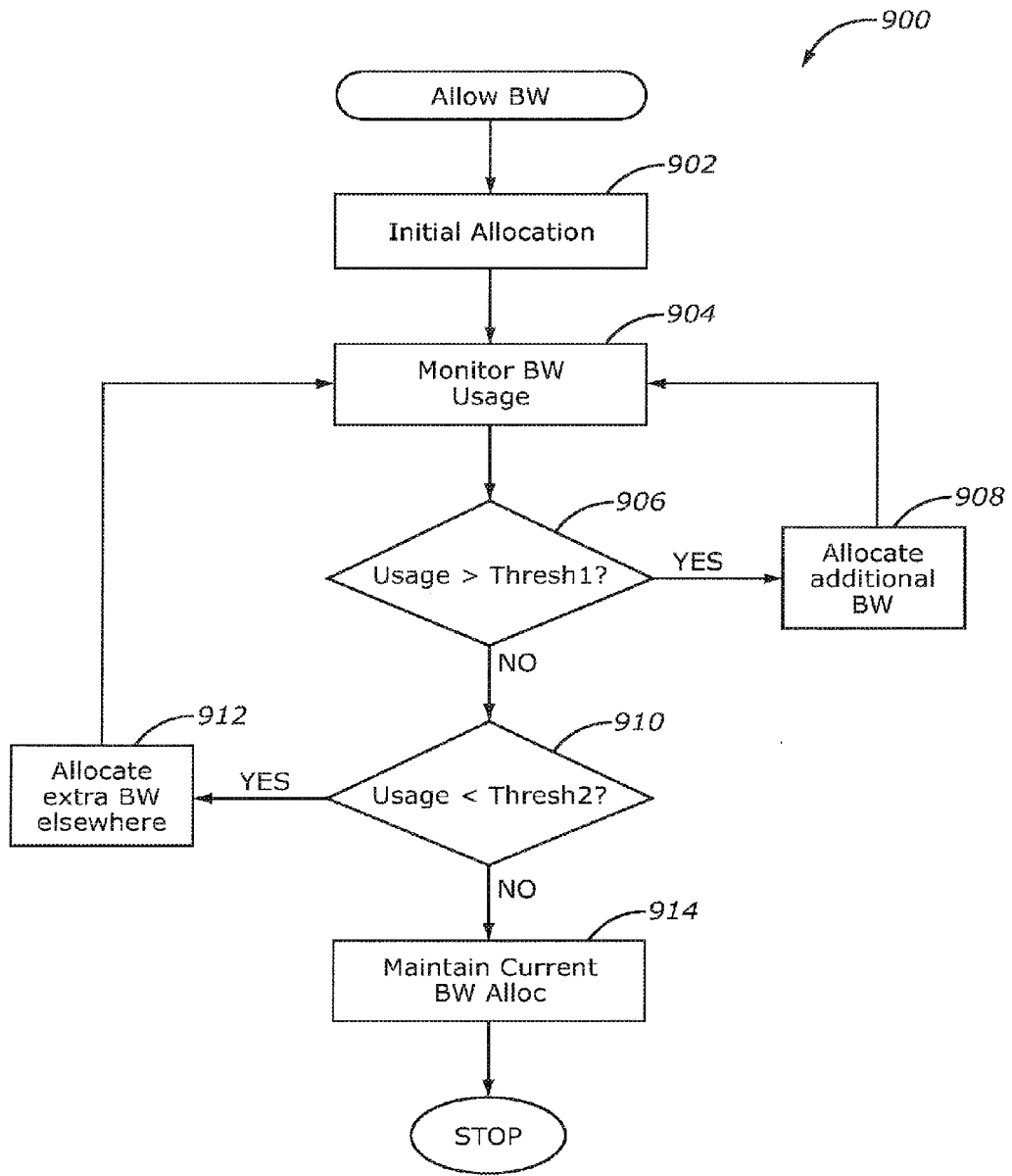
FIG. 9 is a flowchart of an exemplary process for allocating bandwidth in a digital satellite payload.

With reference now to FIG. 9, an exemplary process 900 for re-allocating resources within the payload 200 suitably includes the broad steps of defining an initial allocation (step 902), monitoring resource usage (step 904), and adjusting resource allocation upwardly (steps 906 and 908) or downwardly (steps 910) as needed. While FIG. 9 refers to bandwidth as the particular resource being allocated, various equivalent embodiments will allocate other resources such as electrical power, antenna coverage and the like.

Process 900 begins with an initial allocation of satellite resources (step 902). The initial allocation may be based upon historical or simulation data, previous iterations of process 900, experimental data and/or any other factors. Resource usage is then monitored (step 904) across the various links, channels, slices or other relevant resources to identify excess capacity (step 910) or over-utilized capacity (step 906). In the case of bandwidth, for example, some or all of the channels can be monitored to identify particular channels with bandwidth utilizations above or below certain threshold values. The particular threshold values used may be determined experimentally or from historical data, or may be otherwise determined in any manner. Alternatively, the actual or estimated resource utilizations of various channels may be maintained in a table or other data structure. Excess capacity identified in one or more under-utilized channels (step 912) may then be re-assigned for use by over-utilized channels (step 908), as appropriate. Conversely, channels that are neither over nor under-utilized may not be affected (step 914). Process 900 shown in FIG. 9 is intended to be primarily conceptual; in practice, any resource monitoring and re-allocation process could be used in a wide array of alternate embodiments.

The concept of on-orbit resource re-allocation enables various new business methods for bandwidth-provider organizations. Customers can be offered variable bandwidth services, for example, that are more uniquely tailored to the customer's actual needs than the "transponder circuit" purchase model. Customers may be flexibly charged for actual bandwidth/transmit power consumed and geographical area covered, for example, rather than paying for an inflexible "pipe" of fixed size and power that may be over and/or under-utilized by the customer at different times during the contract period. Alternatively, the "excess" or unused bandwidth and transmit power allocated to various circuit connections may be reclaimed and used for other applications or customers.

Figure 10:
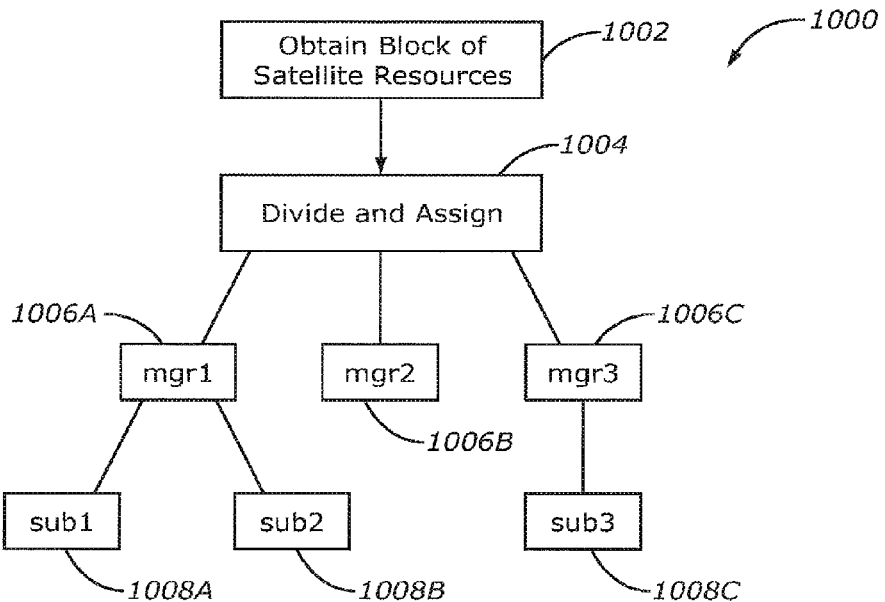
FIG. 10 is a flowchart of an exemplary process for allocating satellite resources.

Another process 1000 enabled by the flexible satellite architecture is shown in the data flow diagram of FIG. 10. Process 1000 allows various parties to independently control a portion of the satellite resources to thereby allocate the resources as desired. With reference now to FIG. 10, a block of satellite resources 1002 is divided and assigned amongst one or more resource managers 1006A-C who are responsible for sub-assigning the resource to various entities 1008A-C operating within the manager's domain. Although not shown in FIG. 10, the sub-entities may further sub-assign the resource to still other entities (or multiple sub-levels of entities) in alternate embodiments. Managers 1006 may be battlefield commanders, for example, who assign satellite bandwidth dynamically among units within their control. If a unit is assigned a fixed amount of bandwidth, for example, a commander may temporarily assign a large portion of bandwidth to one unit (e.g. an unmanned aerial vehicle with a camera) for a short period of time to allow transmission of visual images, large data files or the like. After the need for the bandwidth subsides, that bandwidth may be re-allocated to other units for enhanced voice, data or other traffic. Such flexibility may be particularly useful for network centric operations (NCO) and other military purposes, although the general concept could be used in corporate, industrial, entertainment or other governmental settings as well. Access control could be enforced within digital payload 200 (FIGS. 2-8) by assigning digital credentials (e.g. cryptographic certificates or the like) to the various managers 1006 and other entities 1008 and associating the various certificates with an access table or other data structure within payload 200 (e.g. within T&C module 520 or the like). Numerous other allocation plans and techniques could be formulated in a wide array of equivalent embodiments.

Figure 11:
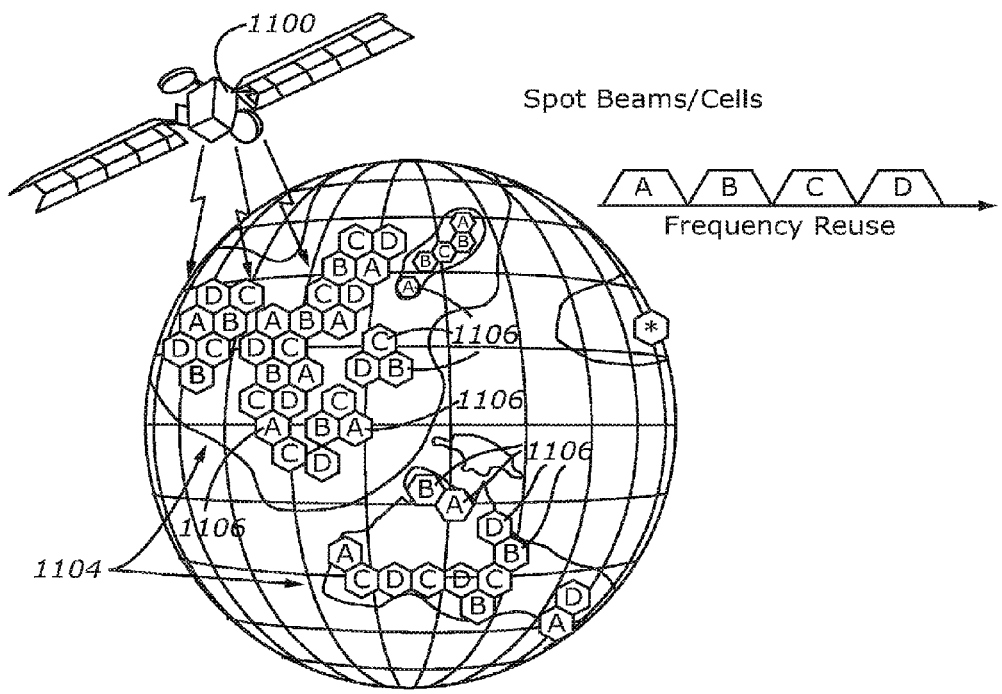
FIG. 11 is a conceptual diagram of an exemplary digital satellite implementation.

In various further embodiments (and with reference now to FIG. 11), digital payload 200 can be combined with multi-beam phased array or similar antennas capable of projecting multiple spot beams to further enhance the flexibility of satellite 1100. In such embodiments, sub-frequency bands can be re-used on the multiple downlink spot beams 1106, thereby improving bandwidth efficiency. One or more broadcast beams 1104 may also be provided. These spot beams 1106 may be narrowly tailored and focused to provide bandwidth solely in desired areas, and may also facilitate frequency hopping techniques that further enhance security.

Accordingly, the overall efficiency of the satellite can be dramatically improved as the entire bandwidth (or other resources) of the satellite become available for use at all times during satellite operation. This effectively provides additional resource capacity that can be sold or leased, thereby significantly increasing the revenue streams available from the digital payload. Moreover, the additional digital processing features (e.g. security, data regeneration, code multiplexing and the like) further improve the usefulness and value of the satellite. Still further, the ability to re-configure the digital payload during design, manufacturing and/or on orbit provides even more value to customers by reducing the long-term risk of investment in such technologies. Because the satellite can be reconfigured on orbit to transmit, receive and process beams at any frequency and carrying any type of data waveforms, the architecture allows for a wide array of applications and a much longer product life than was previously available.

While at least one exemplary embodiment has been presented in the foregoing detailed description, it should be appreciated that a vast number of variations exist. Although various aspects of the invention are frequently described in conjunction with a communications satellite, for example, the various techniques and systems described herein could be readily implemented in other contexts, including aviation, automotive or maritime communications, cellular or other types of terrestrial communications, or in any other environment. It should also be appreciated that the exemplary embodiment or exemplary embodiments are only examples, and are not intended to limit the scope, applicability, or configuration of the invention in any way. The foregoing detailed description will provide those skilled in the art with a convenient road map for implementing the exemplary embodiment or exemplary embodiments. Various changes can be made in the function and arrangement of elements without departing from the scope of the invention as set forth in the appended claims and their legal equivalents. The various steps of the methods, processes and techniques described in the appended claims could be practiced in any temporal order, for example, or may be practiced simultaneously in various equivalent embodiments.

What is claimed is:

1. A flexible satellite comprising:
an uplink antenna configured to receive a plurality of uplink signals;
an all-digital payload comprising:
an analog-to-digital (A/D) converter configured to convert the plurality of uplink signals to digital uplink equivalents;
a digital uplink beamforming module configured to form a plurality of uplink beams from the digital uplink equivalents, the plurality of uplink beams being divisible into a plurality of channels at least one channel of which is divisible into a plurality of sub-bands of varying bandwidths allocated to a respective plurality of users;
a digital channelizer configured to divide the plurality of channels into a plurality of frequency slices, including a plurality of frequency slices for each of at least some of the plurality of sub-bands;
a digital switch matrix configured to route each of the plurality of frequency slices to at least one of a plurality of receiving ports;
a digital combiner configured to communicate with the receiving ports to receive the plurality of frequency slices, and re-assemble the plurality of frequency slices to thereby form a plurality of digital output channels at least one digital output channel of which is composed of a plurality of digital output sub-bands;
a digital downlink beamforming module configured to receive the plurality of digital output channels and form a plurality of downlink beams based thereon; and
a digital to analog (D/A) converter configured to convert the plurality of downlink beams to analog downlink equivalents, and
a downlink antenna configured to transmit the analog downlink equivalents.

2. The flexible satellite of claim 1, wherein one or more resources of the all-digital payload including an uplink frequency plan or downlink frequency plan is reconfigurable during design, manufacturing or on-orbit.

3. The flexible satellite of claim 1, wherein the all-digital payload further comprises a digital gain control module configured to allocate downlink power per user or downlink beam, and wherein the gain control module is modifiable on-orbit.

4. The flexible satellite of claim 1, wherein the all-digital payload further comprises an interference detection module configured to detect an unwanted signal within a single uplink beam or across multiple uplink beams, and wherein the interference detection module is modifiable on-orbit.

5. The flexible satellite of claim 1, wherein the all-digital payload further comprises an adaptive nulling module configured to detect and minimize energy of a hostile signal, including being configured to direct a desired downlink signal at a source of the hostile source, or being configured to digitally extract the hostile signal from an uplink signal within an uplink beam, and wherein the adaptive nulling module is modifiable on-orbit.

6. The flexible satellite of claim 1, wherein the all-digital payload further comprises an output linearization module configured to provide pre-compensation to at least one downlink beam for distortion observed during downlink transmission, and wherein the pre-compensation is modifiable on-orbit in response to one or more of an actual observed distortion observed, ground weather conditions, or other factors.

7. The flexible satellite of claim 1, wherein the all-digital payload further comprises an access control module configured to provide user authentication and access authorization.

8. The flexible satellite of claim 1, wherein the all-digital payload further comprises a resource management module configured to monitor bandwidth consumption on one or more uplink beams or downlink beams, and adjust the uplink and/or downlink bandwidths in real-time to re-assign excess bandwidth to other uplink beams, downlink beams or sub-bands.

9. The flexible satellite of claim 1, wherein the all-digital payload further comprises a regeneration module configured to demodulate at least a portion of at least one of the digital output sub-bands to thereby extract a digital bitstream therefrom, the regeneration module also being configured to digitally process and thereafter remodulate the bitstream.

10. The flexible satellite of claim 9, wherein the regeneration module being configured to digitally process the bitstream includes being configured to perform a code division multiplexing, access control, or cryptographic manipulation of the bitstream.

11. An all-digital payload comprising:
an analog-to-digital (A/D) converter configured to convert a plurality of uplink signals to digital uplink equivalents;
a digital uplink beamforming module configured to form a plurality of uplink beams from the digital uplink equivalents, the plurality of uplink beams being divisible into a plurality of channels at least one channel of which is divisible into a plurality of sub-bands of varying bandwidths allocated to a respective plurality of users;
a digital channelizer configured to divide the plurality of channels into a plurality of frequency slices, including a plurality of frequency slices for each of at least some of the plurality of sub-bands;
a digital switch matrix configured to route each of the plurality of frequency slices to at least one of a plurality of receiving ports;
a digital combiner configured to communicate with the receiving ports to receive the plurality of frequency slices, and re-assemble the plurality of frequency slices to thereby form a plurality of digital output channels at least one digital output channel of which is composed of a plurality of digital output sub-bands;
a digital downlink beamforming module configured to receive the plurality of digital output channels and form a plurality of downlink beams based thereon; and
a digital to analog (D/A) converter configured to convert the plurality of downlink beams to analog downlink equivalents.

12. The all-digital payload of claim 11 further comprising a digital gain control module configured to allocate downlink power per user or downlink beam, and wherein the gain control module is modifiable on-orbit.

13. The all-digital payload of claim 11 further comprising an interference detection module configured to detect an unwanted signal within a single uplink beam or across multiple uplink beams, and wherein the interference detection module is modifiable on-orbit.

14. The all-digital payload of claim 11 further comprising an adaptive nulling module configured to detect and minimize energy of a hostile signal, including being configured to direct a desired downlink signal at a source of the hostile source, or being configured to digitally extract the hostile signal from an uplink signal within an uplink beam, and wherein the adaptive nulling module is modifiable on-orbit.

15. The all-digital payload of claim 11 further comprising an output linearization module configured to provide pre-compensation to at least one downlink beam for distortion observed during downlink transmission, and wherein the pre-compensation is modifiable on-orbit in response to one or more of an actual observed distortion observed, ground weather conditions, or other factors.

16. The all-digital payload of claim 11 further comprising an access control module configured to provide user authentication and access authorization.

17. The all-digital payload of claim 11 further comprising a resource management module configured to monitor bandwidth consumption on one or more uplink beams or downlink beams, and adjust the uplink and/or downlink bandwidths in real-time to re-assign excess bandwidth to other uplink beams, downlink beams or sub-bands.

18. The all-digital payload of claim 11 further comprising a regeneration module configured to demodulate at least a portion of at least one of the digital output sub-bands to thereby extract a digital bitstream therefrom, the regeneration module also being configured to digitally process and thereafter remodulate the bitstream.

19. The all-digital payload of claim 18, wherein the regeneration module being configured to digitally process the bitstream includes being configured to perform a code division multiplexing, access control, or cryptographic manipulation of the bitstream.

20. A digital payload for a satellite configured to receive a plurality of sub-band spectrum via an uplink beam, and provide a downlink beam, the digital payload comprising:
a backplane housing having a backplane bus; and
a plurality of processing cards for processing a respective plurality of channels at least one channel of which is divisible into a plurality of sub-bands of varying bandwidths allocated to a respective plurality of users, each processing card comprising:
a digital uplink beamforming circuit configured to form an uplink beam from a digital uplink equivalent of a respective channel of the respective plurality of channels;
a digital channelizer circuit configured to divide the respective channel into a plurality of frequency slices, at least one of the respective plurality of channels being divided into a plurality of frequency slices for each of at least some of the plurality of sub-bands to which the respective channel corresponds;
a digital switch matrix circuit configured to route each of the plurality of frequency slices to at least one of a plurality of receiving ports;
a digital combiner circuit configured to communicate with the receiving ports to receive the plurality of frequency slices, and re-assemble the plurality of frequency slices to thereby form a digital output channel of a plurality of digital output channels at least one of which is composed of a plurality of digital output sub-bands; and
a digital downlink beamforming circuit configured to receive the digital output channel and form a downlink beam based thereon.

21. The digital payload of claim 20, wherein each of the plurality of processing cards further comprises an interference detection circuit configured to detect an unwanted signal within a single uplink beam or across multiple uplink beams, and wherein the interference detection circuit is modifiable on-orbit.

22. The digital payload of claim 20, wherein each of the plurality of processing cards further comprises an adaptive nulling circuit configured to detect and minimize energy of a hostile signal, including being configured to direct a desired downlink signal at a source of the hostile source, or being configured to digitally extract the hostile signal from an uplink signal within an uplink beam, and wherein the adaptive nulling circuit is modifiable on-orbit.

23. The digital payload of claim 20, wherein the all-digital payload further comprises an output linearization circuit configured to provide pre-compensation to at least one downlink beam for distortion observed during downlink transmission, and wherein the pre-compensation is modifiable on-orbit in response to one or more of an actual observed distortion observed, ground weather conditions, or other factors.

24. The digital payload of claim 20, wherein the all-digital payload further comprises an access control circuit configured to provide user authentication and access authorization.

25. The digital payload of claim 20, wherein the all-digital payload further comprises a resource management circuit configured to monitor bandwidth consumption on one or more uplink beams or downlink beams, and adjust the uplink and/or downlink bandwidths in real-time to re-assign excess bandwidth to other uplink beams, downlink beams or sub-bands.

26. The digital payload of claim 20, wherein the all-digital payload further comprises a regeneration circuit configured to demodulate at least a portion of at least one of the digital output sub-bands to thereby extract a digital bitstream therefrom, the regeneration circuit also being configured to digitally process and thereafter remodulate the bitstream.

27. A method comprising:
converting a plurality of uplink signals to digital uplink equivalents;
forming a plurality of uplink beams from the digital uplink equivalents, the plurality of uplink beams being divisible into a plurality of channels at least one channel of which is divisible into a plurality of sub-bands of varying bandwidths allocated to a respective plurality of users;
dividing the plurality of channels into a plurality of frequency slices, including a plurality of frequency slices for each of at least some of the plurality of sub-bands;
routing each of the plurality of frequency slices to at least one of a plurality of receiving ports;
re-assembling the plurality of frequency slices to thereby form a plurality of digital output channels at least one digital output channel of which is composed of a plurality of digital output sub-bands;
forming a plurality of downlink beams based on the plurality of digital output channels; and
converting the plurality of downlink beams to analog downlink equivalents.

28. The method of claim 27 further comprising allocating downlink power per user or downlink beam.

29. The method of claim 27 further comprising detecting an unwanted signal within a single uplink beam or across multiple uplink beams.

30. The method of claim 27 further comprising detecting and minimizing energy of a hostile signal, including directing a desired downlink signal at a source of the hostile source, or digitally extracting the hostile signal from an uplink signal within an uplink beam.

31. The method of claim 27 further comprising providing pre-compensation to at least one downlink beam for distortion observed during downlink transmission, the pre-compensation being modifiable in response to one or more of an actual observed distortion observed, ground weather conditions, or other factors.

32. The method of claim 27 further comprising providing user authentication and access authorization.

33. The method of claim 27 further comprising monitoring bandwidth consumption on one or more uplink beams or downlink beams, and adjusting the uplink and/or downlink bandwidths in real-time to re-assign excess bandwidth to other uplink beams, downlink beams or sub-bands.

34. The method of claim 27 further comprising demodulating at least a portion of at least one of the digital output sub-bands to thereby extract a digital bitstream therefrom, including digitally processing and thereafter remodulating the bitstream.

35. The method of claim 34, wherein digitally processing the bitstream includes performing a code division multiplexing, access control, or cryptographic manipulation of the bitstream.

* * * * *